Aug. 31, 1954   P. GREGORY ET AL   2,687,948
METHODS OF AND MEANS FOR THERMAL OPERATIONS
Filed Feb. 11, 1950

Patented Aug. 31, 1954

2,687,948

UNITED STATES PATENT OFFICE 2,687,948

METHODS OF AND MEANS FOR THERMAL OPERATIONS

Paul Gregory and Michailas Genas, Paris, France

Application February 11, 1950, Serial No. 143,794

Claims priority, application France February 11, 1949

9 Claims. (Cl. 23—252)

It is known how to carry out thermal operations by bubbling a current of vapour or liquid through a bath of fused metals or salts.

However the methods and apparatus so far in use have the drawback of requiring large bodies of molten metals or salts and moreover, do not insure an efficient heat transfer between the said body and the stream bubbled therethrough.

This invention has for its objects to provide methods and apparatus which will be free of such prior drawbacks and to secure high thermal efficiency with the use of apparatus that are both strong and relatively small in size.

The invention comprises, in the first place, continuously introducing the material to be treated into the body of a substance constituting a liquid bath which is thermally stable at the operating temperature, so as to form an intimate mixture between said substance and said material, passing said mixture through a reaction zone or zones, thereafter separating the treated material or the resulting reaction products from the substance constituting the heating bath, and then recycling said substance wholly or in part into the reaction zone or zones, after having readjusted its temperature.

The cyclic flow of the substance forming the bath may be induced by making use of the difference in specific gravity between the mixture of said substance with the treated material on the one hand, and the substance constituting the bath on the other.

The invention further comprises, in order to secure an efficient contact between the bath and the treated material, the step of introducing said treated material into a series or set of narrow elongated reaction chambers of comparatively great length, such as vertical tubes, in and through which the mixture of emulsion is formed and moves.

The invention further provides apparatus for carrying the above-defined methods and steps of procedure into effect, such apparatus including one or more of the following features:

(a) The reaction chambers are in the form of a nest of tubular elements, each element of which comprises an inlet tube for the material undergoing treatment, terminating at or near the base of the element, and a tube or other equivalent form of elongated reaction chamber, open at its bottom end to receive the liquid constituting the bath, the mixture or emulsion being formed within and moving through said last-mentioned tube.

In particular, said elements may each be formed by a coaxial pair of tubes, with the mixture or emulsion forming in and moving through the annular space defined therebetween.

(b) An upper expansion chamber may be provided into which the nest of vertical reaction tubes or chamber all terminate.

This expansion chamber may contain separating means such as a shock-type separator in the form of a grating for example, for separating the treated substance from the liquid constituting the bath.

(c) Said expansion chamber preferably comprises one or more substantially horizontal surfaces over which the liquid constituting the bath flowing from the separate reaction chambers is caused to stream and mingle into a homogeneous liquid, said surfaces terminating in a settling container.

(d) Preferably there is provided a communication between said settling container and the lower inlet to the vertical reaction tubes or chambers.

(e) According to a preferred form of embodiment, the tubular elements forming the reaction chambers are in turn disposed in outer or casing tubes sealed at their bottom ends and mounted at their tops in the bottom plate of the expansion chamber, said casing tubes being subjected to external heating from any convenient source such as the flame of a furnace or electric resistances.

(f) The material to be treated is for each element introduced into the vertical reaction chamber by means of a suitable feeder device, in the form of fine bubbles or droplets. The feeder may desirably be formed as a bell-shaped element open at its bottom and formed with smaller ports or perforations in its sides and top.

Some exemplary forms of embodiment of the invention will now be described by way of indication and not of limitation, with reference to the accompanying drawings, in which.

Figure 1:
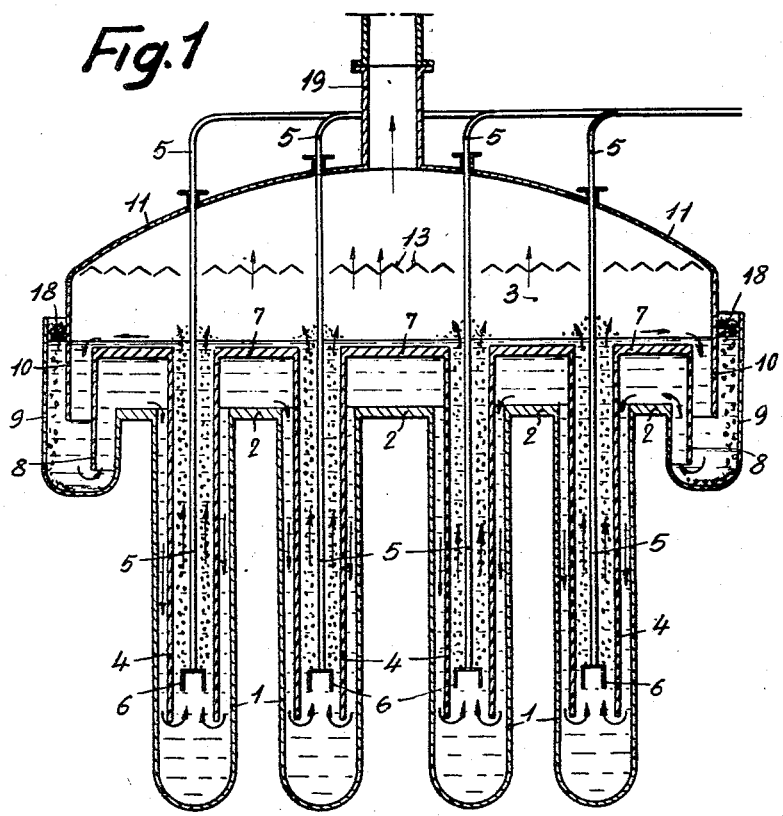
Fig. 1 is a diagrammatical view in cross section of one form of apparatus for carrying out the method of the invention.

As shown in Fig. 1 there is provided a set or nest of vertical tubular elements sealed at their bottom ends and secured at their tops to a plate 2 which forms the bottom of an expansion chamber 3. The tubular elements each comprise, in addition to their outer wall 1, or casing, a vertical reaction chamber in the form of a tube 4 within and coaxial with the outer tube 1 and an intake pipe 5 arranged inside the reaction tube 4 and terminating in a feeder 6.

The tubes 4 constituting the reaction chambers are open at their bottom ends so as to receive thereinto the "bath" fluid entering through the bottom of the tubes 4 and the tubes 4 are secured at their tops to a horizontal plate 7. The plate 7 is externally formed with a depending apron 8 of substantially cylindrical form, which dips into the liquid contained in an annular trough 9 forming a hydraulic seal. The top of the expansion chamber 3 is formed as a bell or dome 11 the depending edges 10 of which also dip into the liquid contained in the trough 9. The dome 11 is formed with apertures through which extend the pipes 5 projecting into the tubular elements 1.

A grating or set of baffles 13 is interposed within the chamber 3 to provide means for separating the treated product from the bath fluid carried therewith. The dome 11 is provided with a stack 19 for the dischage of the treated product.

Figure 2:
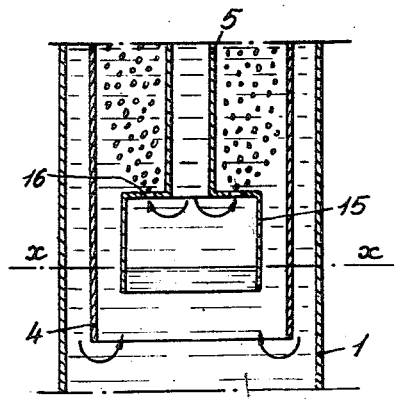
Figs. 2 and 3 are diagrammatic showings on an enlarged scale of two modifications of the feeding device.

To insure proper contact between the reagents, the tubes 5 each terminate at their bottom ends in a distributor or feeder member adapted to distribute the material undergoing treatment in the form of small bubbles throughout the bath. Each such feeder member essentially comprises a small bell-shaped element 15 (see Fig. 2) open at the bottom, and in which the liquid forming the bath will build up to a level $x$—$x$ which depends on the density of the bath, on the distance from the feeder to the surface level of the bath in the chamber 3, and also on the rate of delivery of the feed material treated. The bell 15 is formed in its top and/or side walls with holes such as 16 of small diameter through which the treated material will be discharged in the form of small bubbles. The annular gaps between the tube 5 and bell 15 and between the tube 5 and the tube 4, are so predetermined and correlated that the emulsion or mixture will be generated under good conditions.

Figure 3:
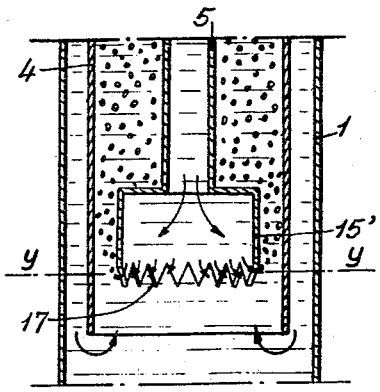

The bell-shaped feeder member may be constructed in various ways. Thus, in the modification shown in Fig. 3, the bell rather than being perforated is provided with serrations or teeth around its bottom edge as at 17. The proportioning and operating characteristics of the apparatus (including dimensions of the elements, pressure, etc...) are so selected and correlated that the sufface level of the bath will be established as at $y$—$y$ at a height such that the treated material will escape in the direction of the arrows through the top of the serrations in the form of bubbles or droplets into the gap between the bell 15' and the tube 5 on the one hand and between the bell 15' and the tube 4 on the other hand.

The operation of the above-described apparatus will now be explained, it being assumed by way of example that the bath comprises a molten metal or alloy and that the desired treatment involves pyrolysis of a liquid material which is partially or wholly vaporised during the treatment.

The apparatus is preliminarily filled with a suitable amount of an appropriate metal impervious to the material undergoing treatment, said metal comprising for example lead. The lead charge is first brought to a molten condition and pre-heated to the desired operating temperature.

Then the material to be treated is introduced in the liquid state into the tubes 5. In passing through the tubes the material is heated and upon reaching the lead bath the material will vaporise, in part or in full, and an intimate mixture or emulsion thereof with the lead will be formed in the tubes 4.

The resulting mixture or emulsion is lighter than the liquid forming the molten bath which lies between the tubes 4 and casings 1, and accordingly the molten bath liquid will be set into motion, the direction of flow being upward through the tubes 4 and downward through the annular space between tube 4 and casing 1.

The rate of flow of the bath, and accordingly the time of dwell or contact between the materials, may be adjusted within a certain range, for a given vertical distance of bubbling flow and a given rate of delivery of feed material, by selecting a suitable diameter for the feeder element 6. That is, the closer this diameter is to that of the casing tube, the smaller will be the flow section available for the bath fluid. The distributor or feeder will thus be seen to perform the function of a flow-regulating valve, of particularly simple construction and high efficiency.

The mixture or emulsion discharged from all of the vertical reaction chambers 4 spreads over the plate 7 on which the bath fluid is de-gassed; the fluid carrying away with it any slag, dirt or impurity and the non-vaporised portion of the material if any, is collected in the settling tank or trough 9. The flow section between the apron portions 8 and 9 is so predetermined that the rate of flow of the bath fluid therethrough will be high enough to prevent any separation of the impurities and/or residual liquid from being accomplished therein. Such separation will thus be effected in the settling trough 9. The liquid constituting the bath is taken off at the bottom and recycled into the heating tubes, while the impurities and residual liquid will float and collect within the space 18 whence they may be easily removed.

The bath fluid, after having been purified in the settler 9 is discharged through the space between plates 7 and 2 and flows down into and through the casing tubes 1 of the tubular reaction chambers.

The grating or equivalent elements 13 in the expansion chamber 3 make it possible to separate the vapours and gases from the entrained blistered fluid. The reaction products which pass through the grating are discharged from the apparatus through the discharge stack 19.

It will be noted that the apparatus described makes it possible to adjust the time of contact or dwell according to requirements without having to reduce the heating area. For this purpose, the intake tubes 5 may be so mounted as to admit of being sunk down to a variable depth into the bath, thereby altering the vertical distance of bubbling flow, it being understood however that such vertical distance should at all times remain greater than a certain minimum value, corresponding to the possibility of starting the bath circulation for a given input rate. The bath fluid circulates throughout the entire height of the tube and thus insures that the heating area remains constant (whereby the production rate is also maintained constant), and further prevents an excessive temperature rise in the bottom portion of the tubes.

The apparatus described may be constructed in various different ways within the purview of the invention. Thus, the tubular elements, rather being than coaxial tubes, may be formed as U-shaped tubes or juxtaposed tubes, so spaced as to provide therebetween the requisite space to constitute the vertical reaction chamber through which the mixture or emulsion is caused to flow. Then again, the recycling flow-circuit for the bath fluid, rather than involving the casing or outer tubes described to bring said fluid down to the point where the feeder members are located, could be designed in a different manner, for instance by a second body located at the base of the nest of tube elements. Furthermore, the plate 7 may be replaced by a number of substantially horizontal tubes or troughs leading to a separator-collecting device. In yet another alternative, the de-slagging or purifying operation rather than involving a settling step may be achieved by making use of the flow velocity of the discharged gases and vapours. To this end it is merely necessary so to dimension the expansion chamber 3 that the velocity of said gas and vapours therethrough will remain sufficiently high to carry away the dirt particles.

However, the preferred embodiment of the apparatus specifically described hereinabove and illustrated in the drawings appears to make it possible to derive greatest advantages and benefit from the practice of the invention; among said advantages the following may be more particularly recited.

The tubes are free to expand during heating to the operating temperature, without generating strains detrimental to the correct mechanical behaviour of the plant.

Heating is accomplished in efficient conditions, whether by convective exchange or radiation, in which latter case the tubes would be symmetrically disposed about the source of radiant heat.

The amount of bath fluid necessary for a given heating area is very low. For instance, in the event of an apparatus including 7 tubes having diameter of 100 x 110 mm. and 1.50 meters in length, the heating area will be 3.70 sq. m., and the volume of the bath fluid 82.500 liters. If it were desired to obtain an equivalent area with the use of a single tank of similar height, the volume of the bath would have to be 580 liters. The bath volume will thus be seen to be reduced in a ratio of 7 to 1 through use of the invention.

The heating area and consequently the production output rate of the apparatus for a given weight of bath fluid, are considerably increased. For instance considering the above-described tubular furnace filled with molten lead as stated, the said area per liter of lead charge is 0.045 sq. m., whereas for a shaft furnace of similar capacity and height, the corresponding area would be 0.015 sq. m., the heating area thus being increased in the ratio of three to one. This advantage is the more marked as the capacity of the furnace is itself larger.

The reduction in weight of the bath will obviously result in a corresponding reduction in the weight of the structure. Moreover, the increase in heating area makes possible a substantial reduction in the temperature of the heating fluids and consequently will enable the plant construction to be more light-weight, or alternatively allow the use of less expensive materials in its construction.

The bath temperature is maintained highly uniform owing to the several flows of bath fluid discharged from the tubes mingling together as they stream over the plate 7.

Heat transfer is increased as a result of the fact that the bath fluid circulates in the form of a thin film over the entire surface of the heating area.

The danger of locally superheating the reaction products is eliminated. The annular space defined between the heating tube 1 and the tube 4 is at all times filled with bath fluid flowing through it, and thereby provides an efficient screening means interposed between the flames and the reaction chamber, without at the same time impeding heat transfer.

All contact between the walls of the heating tubes and the materials undergoing treatment is eliminated. Such materials may sometimes exert a corrosive or otherwise detrimental action on the constituent metal of the heating tubes, or conversely said metal may have a catalytic influence upon secondary reactions between the reagents. The constituent metal of the intermediate tube 4 can be selected accordingly and, since it is not actually subjected to any considerable mechanical stress in service, it may be comparatively thin-walled, a particularly advantageous point when a chemically resistant and accordingly expensive metal has to be used in making the tubes 4. On the other hand, the heating tubes may be made of any metal provided it fulfil the requisite mechanical and thermal conditions, without having to give consideration to the possible corrosive properties of the material undergoing treatment. In effect the intermediate tubes 4 or chimneys serve the function of removable protective liners or jackets which do not hinder the transfer of heat.

In the example described, particularly suitable for use in connection with operations such as pyrolysis, and using a bath comprising molten lead or salts, the fluid constituting the bath was described as being reheated prior to being fed back into the flow cycle, the reaction being assumed to be an endothermical one. It should be distinctly understood however that the invention is equally applicable not only to other endothermic reactions of different character, but also to exothermic reactions. In such case the bath fluid would not, of course, be reheated, but rather cooled prior to recycling.

The illustrative example further assumed that the bath fluid was not liable to attack on the part of the material undergoing treatment. The invention is nevertheless applicable to cases where the substance constituting the bath reacts chemically with the feed material. In such case, an amount of bath fluid equivalent to that which reacts during the operation and is discharged with the product, would have to be added continuously or in batches, by any suitable means.

We claim:

1. An apparatus for treating a material by means of a substance forming a liquid bath, comprising in combination at least one element consisting of three coaxially arranged substantially vertical tubes, the outermost of said coaxially arranged tubes having a closed lower end and an open upper end; a first plate attached to said upper end of said outermost tube and having at its periphery an upwardly directed trough open at the top thereof, the intermediate one of said coaxially arranged tubes having open upper and lower ends; a second plate attached to said upper end of said intermediate tube and arranged above and at a distance apart from said first plate, the innermost of said coaxially arranged tubes having an open lower end and an upper end; a hood element having a lower peripheral portion extending into said trough, said hood element being arranged above said second plate so as to enclose the same and form a chamber therewith; and a piping connected to said upper end of said innermost tube, and piping passing through an aperture provided in said hood element, whereby the material is fed to the apparatus by means of said piping and said innermost tube connected therewith, whereas the liquid bath descends from said first plate in the space between said outermost and said intermediate tubes, so that the material and the substance forming a liquid bath are brought to intimate contact with each other in the space between said intermediate and innermost tubes and are separated from each other on said second plate, the separated material collecting in said chamber formed by said hood element and said second plate.

2. An apparatus for treating a material by means of a substance forming a liquid bath, comprising in combination at least one element consisting of three coaxially arranged substantially vertical tubes, the outermost of said coaxially arranged tubes having a closed lower end and an open upper end; a first plate attached to said upper end of said outermost tube, the intermediate one of said coaxially arranged tubes having open upper and lower ends; a second plate attached to said upper end of said intermediate tube and arranged above and at a distance apart from said first plate, the innermost of said coaxially arranged tubes having an open lower end and an upper end; a hood element arranged above said second plate so as to enclose the same and to form therewith a chamber; a piping connected to said upper end of said innermost tube, said piping passing through an aperture provided in said hood element; a trough attached to the outer perimeter of said first plate; an outer wall forming part of said trough and having an upper rim portion arranged at a higher level than said second plate, a flange forming part of said hood element and extending downward into said trough; and a wall portion attached to the outer perimeter of said second plate and extending downward in said trough, said wall portion forming an annular space with said flange and having a lower edge being spaced apart from the bottom of said trough, whereby the material is fed to the apparatus by means of said piping and said innermost tube connected therewith, whereas the liquid bath descends from said first plate in the space between said outermost and said intermediate tubes, so that the material and the substance forming a liquid bath are brought to intimate contact with each other in the space between said intermediate and innermost tubes and are separated from each other on said second plate, the separated material collecting in said chamber formed by said hood element and said second plate, the liquid bath flowing from said second plate into said annular space and into said trough and round said lower edge of said wall portion and over said first plate back to the space between said outermost and intermediate tubes.

3. An apparatus for treating a material by means of a substance forming a liquid bath, comprising in combination, a plurality of elements each consisting of three coaxially arranged substantially vertical tubes, the outermost ones of said coaxially arranged tubes having each a closed lower end and an open upper end; a first plate attached to said upper ends of said outermost tubes and having at its periphery an upwardly directed trough open at the top thereof, the intermediate ones of said coaxially arranged tubes having each open upper and lower ends; a second plate attached to said upper ends of said intermediate tubes and arranged above and at a distance apart from said first plate, the innermost ones of said coaxially arranged tubes having each an open lower end and an upper end; a hood element having a lower peripheral portion extending into said trough, said hood element being arranged above said second plate so as to enclose the same and form a chamber therewith; and a piping connected to said upper ends of said innermost tubes, said piping passing through apertures provided in said hood element, whereby the material is fed to the apparatus by means of said piping and said innermost tubes connected therewith, whereas the liquid bath descends from said first plate in the spaces between said outermost and said intermediate tubes, so that the material and the substance forming a liquid bath are brought to intimate contact with each other in the spaces between said intermediate and innermost tubes and are separated from each other on said second plate, the separated material collecting in said chamber formed by said hood element and said second plate.

4. An apparatus for treating a material by means of a substance forming a liquid bath, comprising in combination a plurality of elements each consisting of three coaxially arranged substantially vertical tubes, the outermost ones of said coaxially arranged tubes having each a closed lower end and an open upper end; a first substantially horizontal plate attached to said upper ends of said outermost tubes, the intermediate ones of said coaxially arranged tubes having each open upper and lower ends; a second substantially horizontal plate attached to said upper ends of said intermediate tubes and arranged above and at a distance apart from said first plate, the innermost ones of said coaxially arranged tubes having each an open lower end and an upper end; a hood element arranged above said second plate so as to enclose the same and to form therewith a chamber; a piping connected to said upper ends of said innermost tubes, said piping passing through apertures provided in said hood element; a trough attached to the outer perimeter of said first plate; an outer wall forming part of said trough and having an upper rim portion arranged at a higher level than said second plate; a flange forming part of said hood element and extending downward into said trough; and a wall portion attached to the outer perimeter of said second plate and extending downward in said trough, said wall portion forming an annular space with said flange and having a lower edge being spaced apart from the bottom of said trough, whereby the material is fed to the apparatus by means of said piping and said innermost tubes connected therewith, whereas the liquid bath descends from said first plate in the spaces between said outermost and said intermediate tubes, so that the material and the substance forming a liquid bath are brought to intimate contact with each other in the spaces between said intermediate and innermost tubes and are separated from each other on said second plate, the separated material collecting in said chamber formed by said hood element and said second plate, the liquid bath flowing from said second plate into said annular space and into said trough and round said lower edge of said wall portion and over said first plate back to the spaces between said outermost and intermediate tubes.

5. An apparatus for treating a material by means of a substance forming a liquid bath, comprising in combination at least one element consisting of three coaxially arranged substantially vertical tubes, the outermost of said coaxially arranged tubes having a closed lower end and an open upper end; a first plate attached to said upper end of said outermost tube and having at its periphery an upwardly directed trough open at the top thereof, the intermediate one of said coaxially arranged tubes having open upper and lower ends; a second plate attached to said upper end of said intermediate tube and arranged above and at a distance apart from said first plate, the innermost of said coaxially arranged tubes having an open lower end and an upper end; a hood element having a lower peripheral portion extending into said trough, said hood element being arranged above said second plate so as to enclose the same and form a chamber therewith; an open end portion connected to said lower end of said innermost tube and having a cross-section being considerably larger than the cross-section of said innermost tube, said end portion being arranged inside said intermediate tube; and a piping connected to said upper end of said innermost tube, said piping passing through an aperture provided in said hood element, whereby the material is fed to the apparatus by means of said piping and said innermost tube connected therewith, whereas the liquid bath descends from said first plate in the space between said outermost and said intermediate tubes, so that the material and the substance forming a liquid bath are brought to intimate contact with each other in the space between said intermediate and innermost tubes and are separated from each other on said second plate, the separated material collecting in said chamber formed by said hood element and said second plate.

6. An apparatus for treating a material by means of a substance forming a liquid bath, comprisin in combination at least one element consisting of three coaxially arranged substantially vertical tubes, the outermost of said coaxially arranged tubes having a closed lower end and an open upper end; a first plate attached to said upper end of said outermost tube, the intermediate one of said coaxially arranged tubes having open upper and lower ends; a second plate attached to said upper end of said intermediate tube and arranged above and at a distance apart from said first plate, the innermost of said coaxially arranged tubes having an open lower end and an upper end; an open end portion connected to said lower end of said innermost tube and having a cross-section being considerably larger than the cross-section of said innermost tube, said end portion being arranged inside said intermediate tube; a hood element arranged above said second plate so as to enclose the same and to form therewith a chamber; a piping connected to said upper end of said innermost tube, said piping passing through an aperture provided in said hood element; a trough attached to the outer perimeter of said first plate; an outer wall forming part of said trough and having an upper rim portion arranged at a higher level than said second plate; a flange forming part of said hood element and extending downward into said trough; and a wall portion attached to the outer perimeter of said second plate and extending downward in said trough, said wall portion forming an annular space with said flange and having a lower edge being spaced apart from the bottom of said trough, whereby the material is fed to the apparatus by means of said piping and said innermost tube connected therewith, whereas the liquid bath descends from said first plate in the space between said outermost and said intermediate tubes, so that the material and the substance forming a liquid bath are brought to intimate contact with each other in the space between said intermediate and innermost tubes and are separated from each other on said second plate, the separated material collecting in said chamber formed by said hood element and said second plate, the liquid bath flowing from said second plate into said annular space and into said trough and round said lower edge of said wall portion and over said first plate back to the space between said outermost and intermediate tubes.

7. An apparatus for treating a material by means of a substance forming a liquid bath, comprising in combination, a plurality of elements each consisting of three coaxially arranged substantially vertical tubes, the outermost ones of said coaxially arranged tubes having each a closed lower end and an open upper end; a first plate attached to said upper ends of said outermost tubes, the intermediate ones of said coaxially arranged tubes having each open upper and lower ends; a second plate attached to said upper ends of said intermediate tubes and arranged above and at a distance apart from said first plate, the innermost ones of said coaxially arranged tubes having each an open lower end and an upper end; a hood element arranged above said second plate so as to enclose the same and to form therewith a chamber; open end portions connected to said lower ends of said innermost tubes, respectively, and having cross-sections being considerably larger than the cross-sections of said innermost tubes, respectively, said end portions being arranged inside said intermediate tubes, respectively; a piping connected to said upper ends of said innermost tubes, said piping passing through apertures provided in said hood element; a trough attached to the outer perimeter of said first plate; an outer wall forming part of said trough and having an upper rim portion arranged at a higher level than said second plate; a flange forming part of said hood element and extending downward into said trough; and a wall portion attached to the outer perimeter of said second plate and extending downward in said trough, said wall portion forming an annular space with said flange and having a lower edge being spaced apart from the bottom of said trough, whereby the material is fed to the apparatus by means of said piping and said innermost tubes connected therewith, whereas the liquid bath descends from said first plate in the spaces between said outermost and said intermediate tubes, so that the material and the substance forming a liquid bath are brought to intimate contact with each other in the spaces between said intermediate and innermost tubes and are separated from each other on said second plate, the separated material collecting in said chamber formed by said hood element and said second plate, the liquid bath flowing from said second plate into said annular space and into said trough and round said lower edge of said wall portion and over said first plate back to the spaces between said outermost and intermediate tubes.

8. An apparatus for treating with a liquid substance a fluid having a lower specific weight than said liquid, comprising, in combination, an upwardly extending conduit having a lower end and an upper end; a downwardly extending conduit having an upper end and a lower end and communicating at said lower end with said lower end of said upwardly extending conduit; a transversely extending separation chamber communicating with the upper ends of both said conduits so that said conduits communicate with each other at their upper ends through said separation chamber; a liquid bath of said liquid substance completely filling said conduits and partly filling said separation chamber so as to leave a free space within said separation chamber above the level of said liquid bath; means for introducing into said upwardly extending conduit at a point spaced substantially below the upper end thereof bubbles of the fluid to be treated, said fluid bubbles in said liquid bath rising in the same due to the lower specific weight of said fluid, causing thereby upward movement of the liquid bath within said upwardly extending conduit which in turn causes the liquid bath in said separation chamber to move in said downwardly directed conduit in a downward direction and from said lower end of the latter upwardly into said lower end of said upwardly extending conduit thereby creating circulation of said liquid bath through said conduits and said separation chamber; exhaust means connected to said separation chamber above the level of said liquid bath therein through which the fluid treated by said liquid bath during its upward movement in said upwardly extending conduit and accumulating in said free space in said separation chamber above the level of said liquid bath therein is adapted to be removed; and a settling chamber included in and forming part of said downwardly extending conduit in which impurities removed from said fluid during treatment thereof and carried along by said liquid bath during its circulation are separated from said liquid bath.

9. An apparatus according to claim 8 in which said means for introducing fluid are constructed and arranged for introduction of said fluid into said upwardly extending conduit at the bottom end thereof and in which said settling chamber is arranged at the upper end of said downwardly extending conduit.

References Cited in the file of this patent

UNITED STATES PATENTS

| Number | Name | Date |
|---|---|---|
| 1,318,657 | Frasch | Oct. 14, 1919 |
| 1,412,540 | Nelson | Apr. 11, 1922 |
| 1,435,652 | Murrie | Nov. 14, 1922 |
| 1,566,416 | Niece | Dec. 22, 1925 |
| 1,610,078 | Duckham | Dec. 7, 1926 |
| 1,896,986 | Tillmann | Feb. 7, 1933 |
| 2,431,060 | Mason | Nov. 18, 1947 |

FOREIGN PATENTS

| Number | Country | Date |
|---|---|---|
| 592,311 | Germany | Apr. 5, 1934 |

OTHER REFERENCES

Babor & Lehrman (General College Chem.), Crowell Co., 1940, page 359.